(12) United States Patent
Katayama (10) Patent No.: US 6,906,708 B1
(45) Date of Patent: Jun. 14, 2005

(54) IMAGE PROCESSING METHOD AND APPARATUS, AND STORAGE MEDIUM

(75) Inventor: Akihiro Katayama, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/500,455

(22) Filed: Feb. 9, 2000

(30) Foreign Application Priority Data

Mar. 26, 1999 (JP) .......................................... 11-084660

(51) Int. Cl.$^7$ .......................................... G06T 15/00
(52) U.S. Cl. .................................................. 345/419
(58) Field of Search ................................ 345/419, 427, 345/613

(56) References Cited

U.S. PATENT DOCUMENTS

| | | | | |
|---|---|---|---|---|
| 5,327,257 A | * | 7/1994 | Hrytzak et al. | 358/447 |
| 5,613,048 A | * | 3/1997 | Chen et al. | 345/419 |
| 6,040,835 A | * | 3/2000 | Gibson | 345/424 |
| 6,091,797 A | * | 7/2000 | Xie et al. | 378/62 |
| 6,097,394 A | * | 8/2000 | Levoy et al. | 345/419 |
| 6,233,308 B1 | * | 5/2001 | Hsieh | 378/62 |
| 6,268,862 B1 | * | 7/2001 | Uchiyama et al. | 345/427 |
| 6,335,754 B1 | * | 1/2002 | Endo et al. | 348/37 |
| 6,445,807 B1 | * | 9/2002 | Katayama et al. | 382/100 |

OTHER PUBLICATIONS

"Light field rendering", Levoy et al., 1996, Proceedings of the 23rd annual conference on Computer graphics and interactive techniques Aug. 1996 p. 31–42.*
"Plenoptic modeling: an image–based rendering system", McMillan et al.,Proceedings of the 22nd annual conference on Computer graphics and interactive techniques Sep. 1995, p. 39–46.*
"View interpolation for image synthesis",Shenchang Eric Chen , Lance Williams, Proceedings of the 20th annual conference o Computer graphics and interactive techniques Sep. 1993, p. 279–284.*
"QuickTime VR: an image–based approach to virtual environment navigation", Shenchang Eric Chen, Proceedings of the 22nd annual conference on Computer graphics and interactive techniques Sep. 1995, p. 29–38.*
"A Cyber–Space Creation by Mixing Ray Space Data with Geometric Models", A. Katayama, et al., IEICE Journal D–11, vol. J 80–D–II, No. 11, pp 3048–3057, Nov. 1997.
"Transformation of Hologram and Ray Space for Integrated 3D Visual Communication", T. Fujii, et al., 3–D Image Conference '95, pp 220–225, Jul. 1995.
Akio Ishikawa, et al., "Interactive Operation on 3–D Real Images Using Ray Description", IEICE Journal D–II, vol. J81–D–II No. 5, pp. 850–860, May 1998.
Tomoko Maruyama, et al., "Adaptive Texture Mapping: An Image–Based Approach to Time Critical Rendering", IPSJ SIG Notes 96–CG–79 pp. 39–46, Feb. 1996.

* cited by examiner

*Primary Examiner*—Michael Razavi
*Assistant Examiner*—Ryan Yang
(74) *Attorney, Agent, or Firm*—Fitzpatrick, Cella, Harper & Scinto (57) ABSTRACT

An image processing apparatus includes recording unit which has recorded image information appended with quantized space information in units of pixels; setting unit for setting a sampling rate in accordance with moving speed in a virtual space; reconstruction unit for reconstructing an image by reading out image information from the recording unit in accordance with the sampling rate set by the setting unit, and interpolation unit for interpolating pixels at empty pixel positions to obtain a resolution of an image required for display when the reconstruction unit reconstructs the image at a resolution lower than the resolution of the image required for display.

9 Claims, 13 Drawing Sheets

IMAGE PROCESSING METHOD AND APPARATUS, AND STORAGE MEDIUM

FIELD OF THE INVENTION

The present invention relates to an image processing apparatus and method for reconstructing an image, which records image information appended with quantized space information in units of pixels such as image information expressed by, e.g., a ray space theory, in a virtual space and, more particularly, to an improvement for assuring a high rendering frame rate by lowering resolution as, e.g., motion in the space gets faster upon reconstructing an image in a virtual space on the basis of recorded image information.

BACKGROUND OF THE INVENTION

Attempts to describe a virtual space on the basis of a ray space theory have been proposed. See, for example, "Implementation of Virtual Environment by Mixing CG model and Ray Space Data", IEICE Journal D-11, Vol. J80-D-11 No. 11, pp. 3048–3057, November 1997, or "Mutual Conversion between Hologram and Ray Space Aiming at 3D Integrated Image Communication", 3D Image Conference, and the like.

A recording method of ray space data will be explained below.

Figure 1:
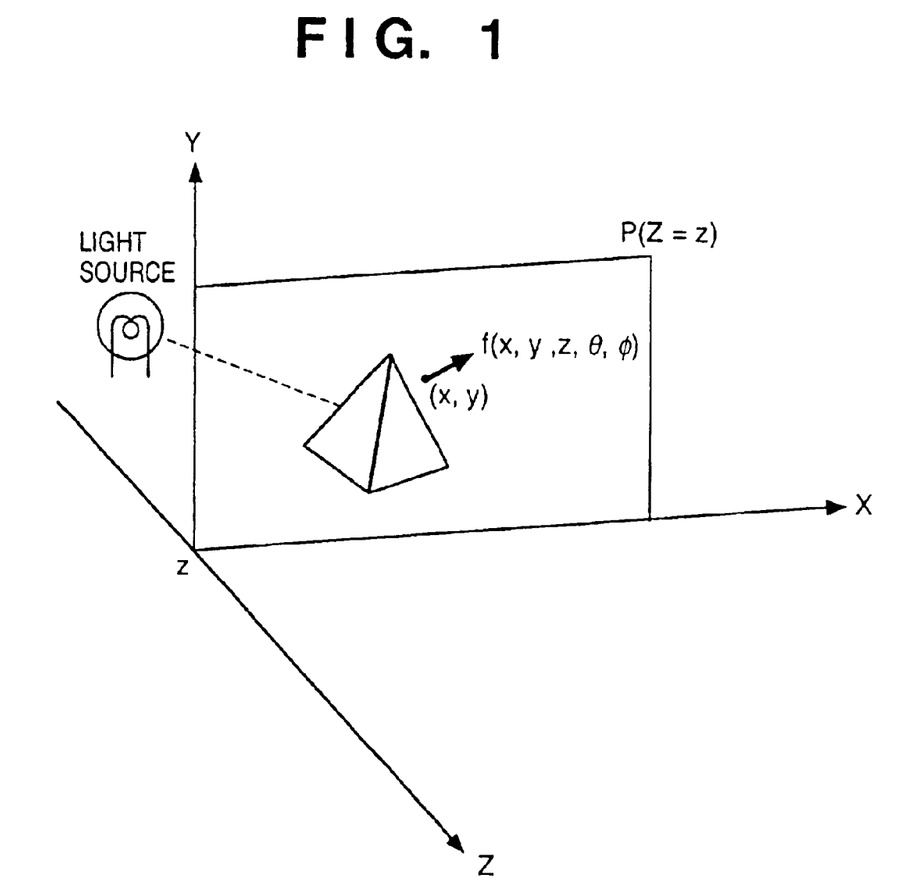
FIG. 1 is a view for explaining the principle of generating ray space data.

As shown in FIG. 1, a coordinate system 0-X-Y-Z is defined in a real space. A light ray that passes through a reference plane P (Z=z) perpendicular to the Z-axis is defined by a position (x, y) where the light ray crosses P, and variables θ and φ that indicate the direction of the light ray. More specifically, a single light ray is uniquely defined by five variables (x, y, z, θ, φ). If a function that represents the light intensity of this light ray is defined as f, light ray group data in this space can be expressed by f(x, y, z, θ, φ). This five-dimensional space is called a "ray space".

Figure 2:
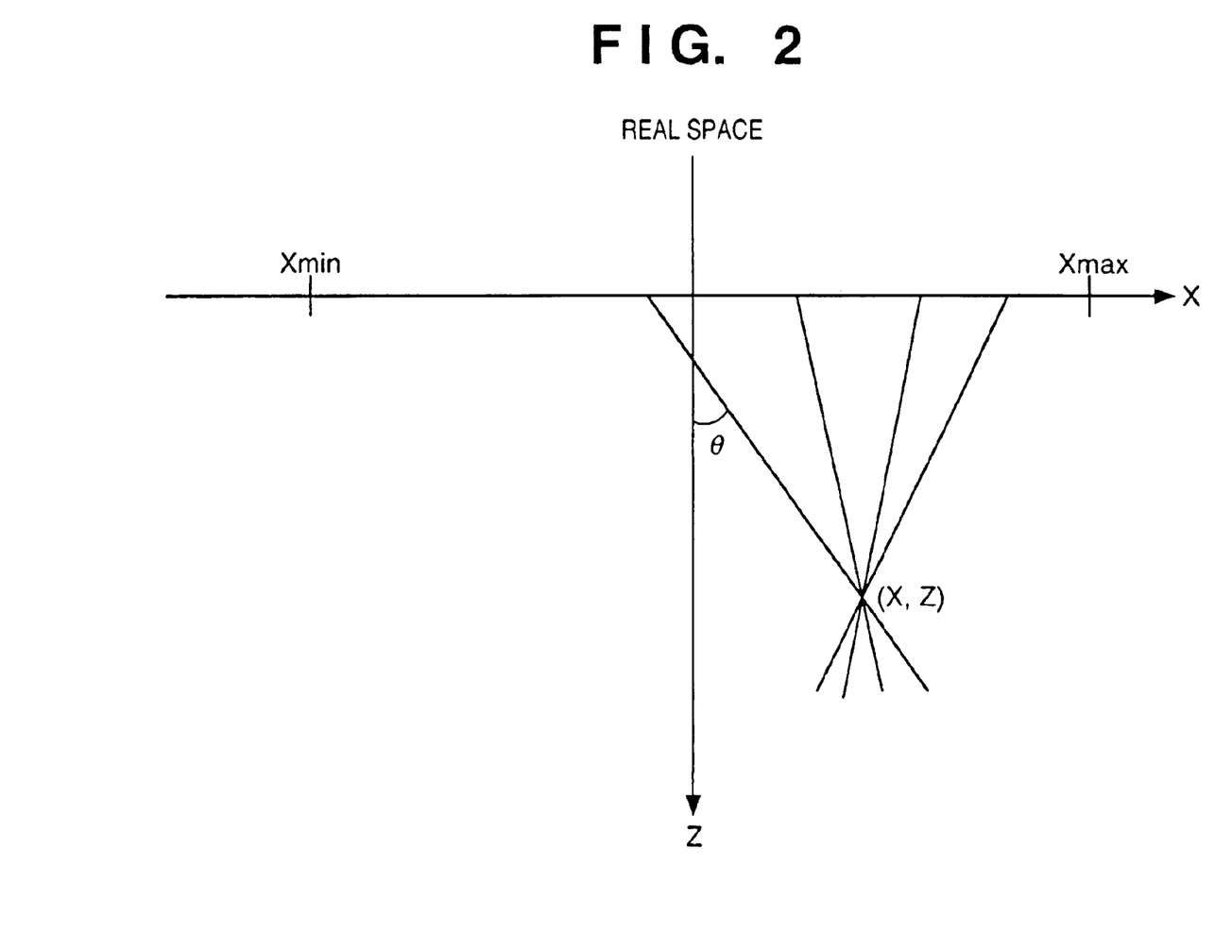
FIG. 2 is a view for explaining data in a real space.
Figure 3:
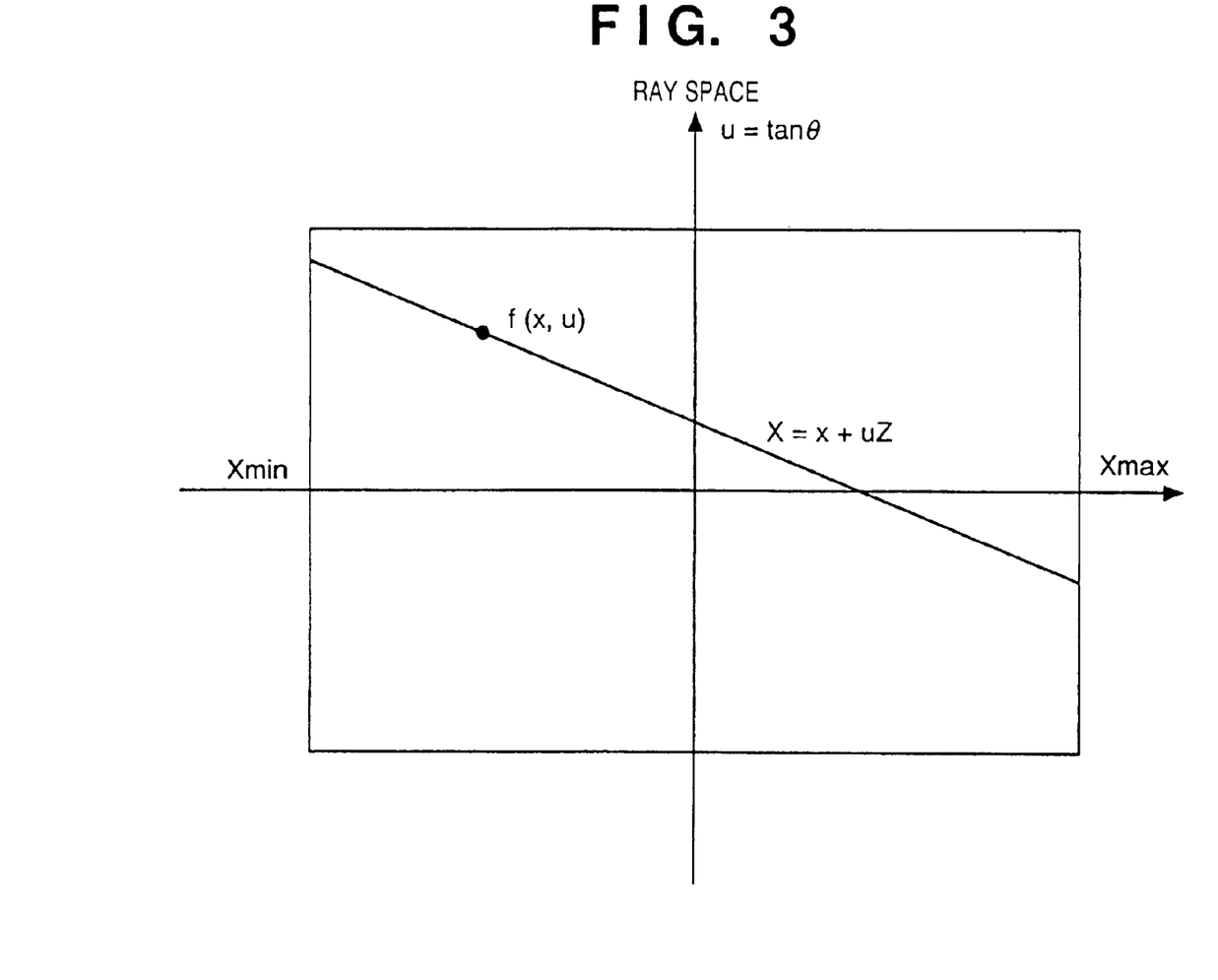
FIG. 3 is a view showing the space shown in FIG. 2, which is expressed by ray space data.

If the reference plane P is set at z=0, and disparity information of a light ray in the vertical direction, i.e., the degree of freedom in the φ direction is omitted, the degree of freedom of the light ray can be regenerated to two dimensions (x, θ). This x-θ two-dimensional space is a partial space of the ray space. As shown in FIG. 3, if u=tan θ, a light ray (FIG. 2) which passes through a point (X, Z) in the real space is mapped onto a line in the x-u space, said line is given by:

$$X=x+uZ \quad (1)$$

Image sensed by a camera reduces to receiving light rays that pass through the lens focal point of the camera at an image sensing surface, and converting their brightness levels and colors into an image. In other words, a light ray group which passes through one point, i.e., the focal point, in the real space is captured as an image a number of pixels. In this, since the degree of freedom in the φ direction is omitted, and the behavior of a light ray is examined in only the X-Z plane, only pixels on a line segment that intersects a plane orthogonal with respect to the Y-axis need to be considered. In this manner, by sensing an image, light rays that pass through one point can be collected, and data on a single line segment in the x-u space can be captured by single image sensing process.

Figure 4:
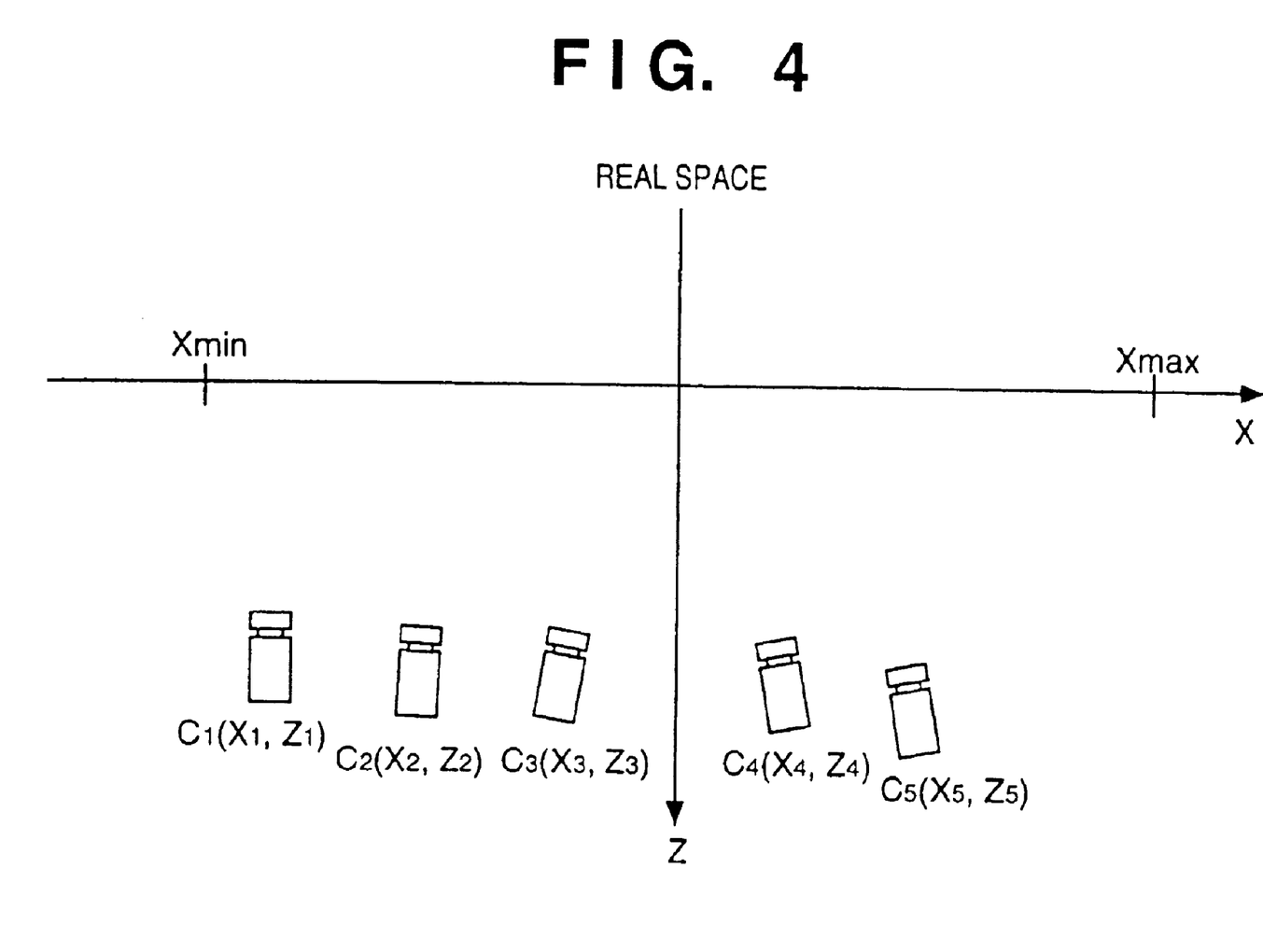
FIG. 4 shows a plurality of cameras to explaining principle of generating real space data.
Figure 5:
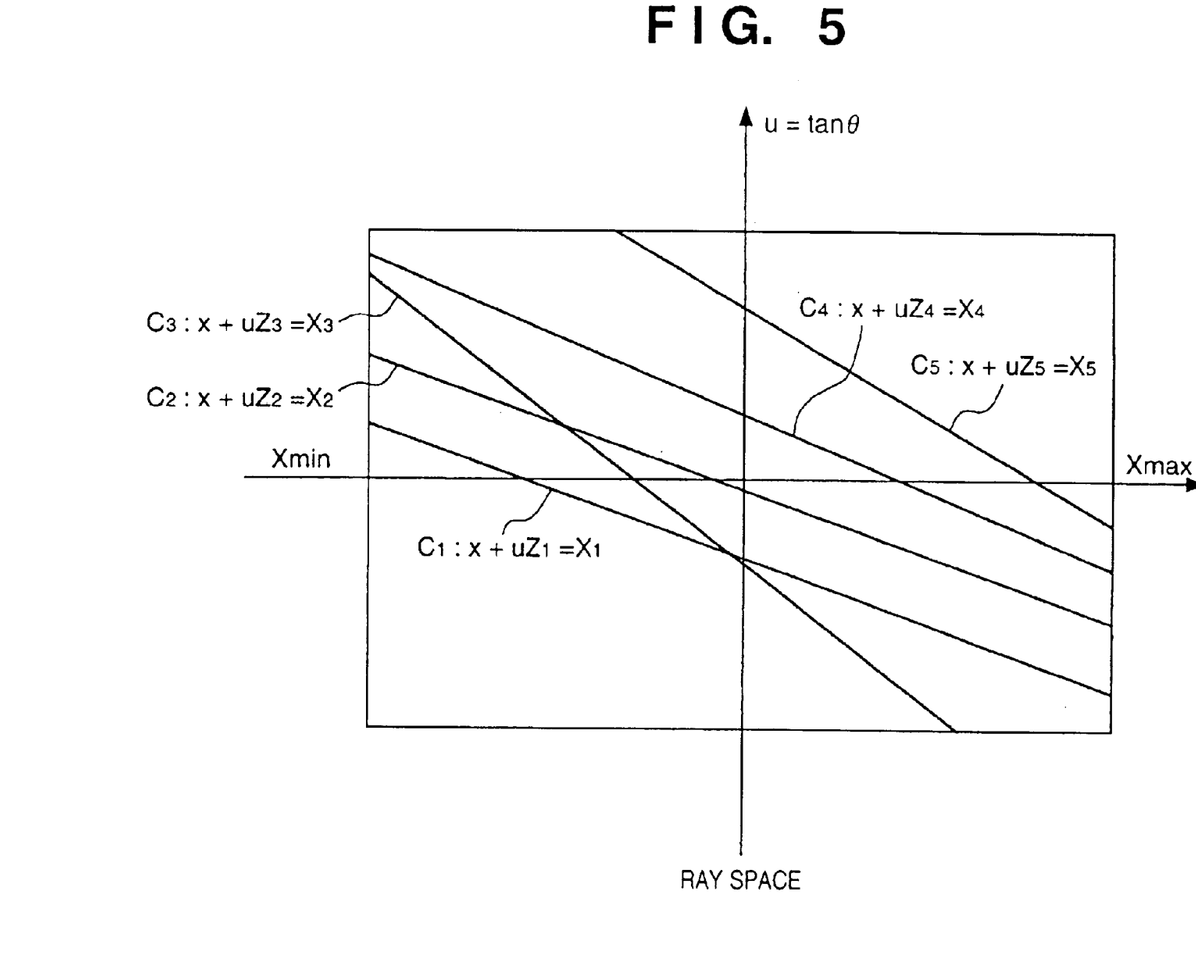
FIG. 5 shows the view of each of a plurality of cameras for explaining the principle of generating ray space data.

When this image sensing is done a large number of times by changing the view point position, light ray groups which pass through a large number of points can be captured. When the real space is sensed using N cameras, as shown in FIG. 4, data on a line given by:

$$x+Z_n u = X_n \quad (2)$$

can be inputted in correspondence with a focal point position $(X_n, Z_n)$ of the n-th camera $C_n$ (n=1, 2, . . . , N), as shown in FIG. 5. In this way, when an image is sensed from a sufficiently large number of view points, the x-u space can be densely filled with data.

Figure 6:
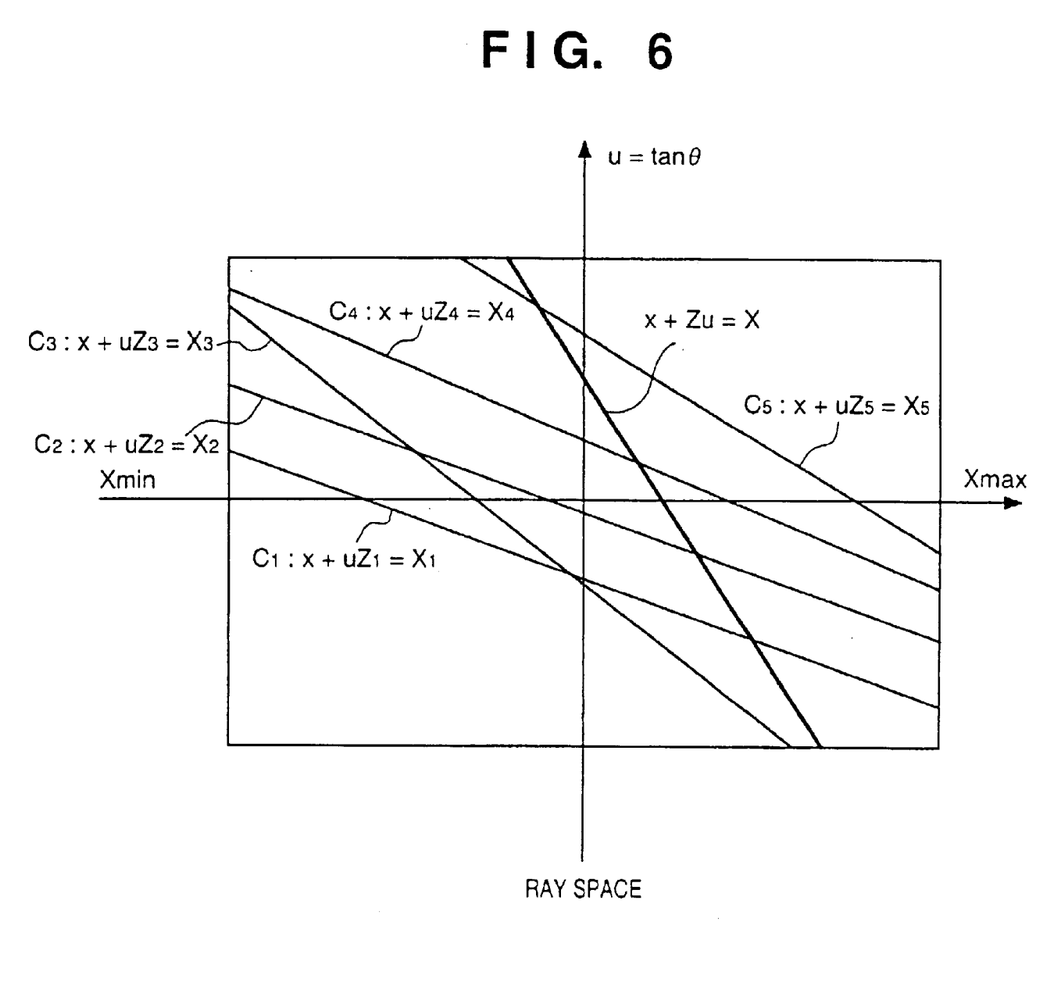
FIG. 6 is a view for explaining the principle of reconstructing a real space from ray space data when there are a plurality of cameras.
Figure 7:
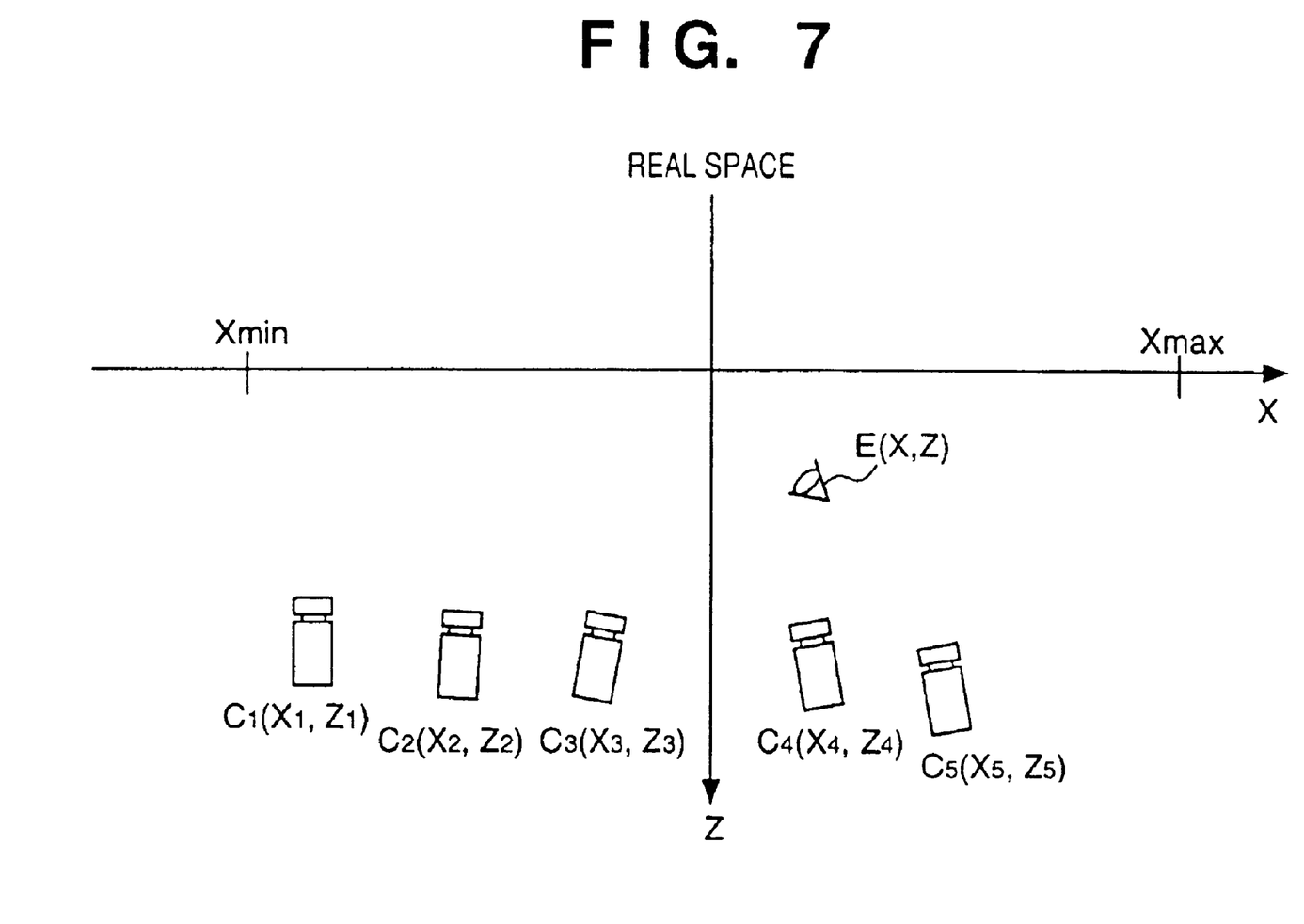
FIG. 7 is a view for explaining the principle of reconstructing a real space from ray space data when there are a plurality of cameras.

Conversely, an observation image from a new arbitrary view point position can be generated (FIG. 7) from the data of the x-u space (FIG. 6). As shown in FIG. 7, an observation image from a new view point position E(X, Z) indicated by an eye mark can be generated by reading out data of a line given by equation (1) from the x-u space.

One major feature of ray space data is that ray space data is defined for each pixel. That is, frame data for one scene is expressed by ray space data corresponding to the number of pixels of that frame. Hence, the data size of ray space data does not depend on the complexity of a scene, but depends on only the size and resolution of the scene; the computation volume depends only on the total number of pixels of the scene to be generated. In case of normal CG data, when a scene becomes more complex, the complexity cannot be expressed unless the number of polygons is increased. Hence, the computation volume increases, resulting in low rendering performance. However, in case of ray space data, if the total number of pixels of an image to be rendered remains the same, rendering performance is constant independently of the complexity of scenes.

A case will be examined wherein the user walks through a virtual space generated using such ray space data. In such case, several ten frames of images per sec must be generated and presented to make the user feel as if he or she was walking through the virtual space.

However, when the total number of pixels of an image reconstructed from ray space data in each frame is large, a long rendering time per frame is required, and the rendering frame rate cannot catch up with the moving speed.

When the user manipulates (moves, rotates, or the like) an object in the scene at high speed, and that object is generated and rendered based on ray space data, if the number of pixels of the object is large, rendering cannot be done in time.

SUMMARY OF THE INVENTION

The present invention has been proposed to solve the conventional problems, and has as its object to provide an image processing apparatus and method, which reconstruct an image by capturing image information at resolution below that of image information at time of recording by lowering the sampling rate when no problem is expected even if lowering resolution (e.g., an object moving in a space), upon reconstructing an image from image data such as ray space data, image information of which includes space information, thereby assuring high rendering frame rate.

In order to achieve the above object, an image processing apparatus of the present invention comprises:

recording means for recording image information appended with quantized space information in units of pixels;

setting means for setting a sampling rate;

reconstruction means for reconstructing an image by reading out image information from the recording means in accordance with the sampling rate set by the setting means; and interpolation means for interpolating pixels at empty pixel positions to obtain a resolution of an image required for display when the reconstruction means reconstructs the image at a resolution lower than the resolution of the image required for display.

When the sampling rate is determined on the basis of, e.g., the moving speed in the virtual space, image information is read out at that sampling rate to reconstruct an image. When the sampling rate is below that of the recording resolution, the time required for reconstructing an image can be shortened. In addition, a decrease in resolution can be compensated for by pixel interpolation (e.g., texture mapping).

A method of the present invention as another arrangement for achieving the above object is an image processing method for reconstructing an image which is recorded as ray space data in recording means according to a first resolution, comprising:

a step of detecting a moving speed in a space of a reconstructed image;

a step of determining a second resolution of ray space data to be read out from the recording means in accordance with a detected moving speed in the space, and reading out ray space data from the recording means in accordance with the second resolution; and a step of interpolating pixels at empty pixel positions produced in correspondence with dropping to the second resolution smaller than the first resolution.

The above object can also be achieved by an image processing method or a storage medium that stores a program for implementing this method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

An image processing apparatus and method to which the present invention is applied will be described in detail hereinafter with reference to the accompanying drawings. In this image processing apparatus and method, when the user walks through a virtual space or manipulates (moves, rotates, or the like) an object in the virtual space expressed by ray space data, the rendering frame rate can catch up with the moving speed in the space by lowering the resolution by decreasing the sampling rate of ray space data, and the decrease in resolution is compensated for by pixel interpolation such as texture mapping.

Figure 8:
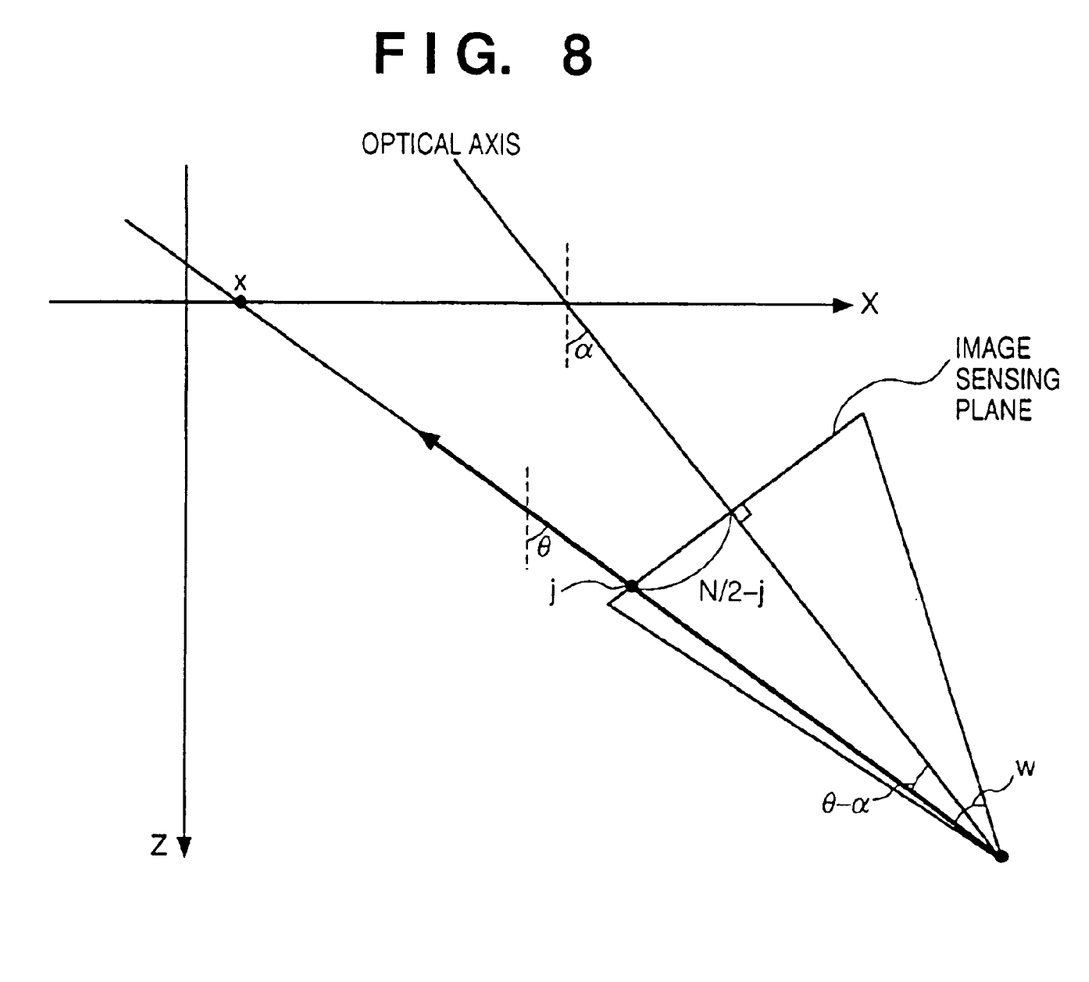
FIG. 8 is a view for explaining quantization in an embodiment of the present invention.

FIG. 8 is a view for explaining quantization of ray space data of this embodiment. More specifically, assume that ray space data to be processed by the image processing apparatus of this embodiment is image data obtained using a camera which has a CCD having N pixels in the main scanning direction, a field angle w, and an intersection angle α between the optical axis and Z-axis. If the pixels of the CCD are respectively ordered 0, ..., N-1; θ represents the angle the light ray which passes through the j-th pixel makes with the Z-axis; and x represents the position where the light ray which passes through the j-th pixel intersects with the X-axis, we have:

$$\frac{N}{2}\tan(\theta - \alpha) = \left(\frac{N}{2} - j\right)\tan\left(\frac{w}{2}\right) \quad (3)$$

Note that mapping in FIG. 8 is done with respect to the Y-axis. If equation (3) holds for the j-th pixel on Y=m-th line (m=an arbitrary number), the angle θ corresponding to pixel j can be computed from equation (3). That is, if I"(i) represents the i-th image data, and that image data is converted into image data I' in an (x, θ) space, which is further converted into image data I in an (x, u) space by u=tan θ, this process is expressed by:

$$I''(i)=I'(x, \theta)=I(x, u) \quad (4)$$

u and x are appropriately quantized. For example, as for the x-axis, the spacing between two neighboring light rays on the x-axis is obtained, and quantization is done using this spacing in a quantization step. Also, as for the u-axis, quantization is done using the tangent of an angle between two neighboring pixels and the camera view point position.

Figure 10:
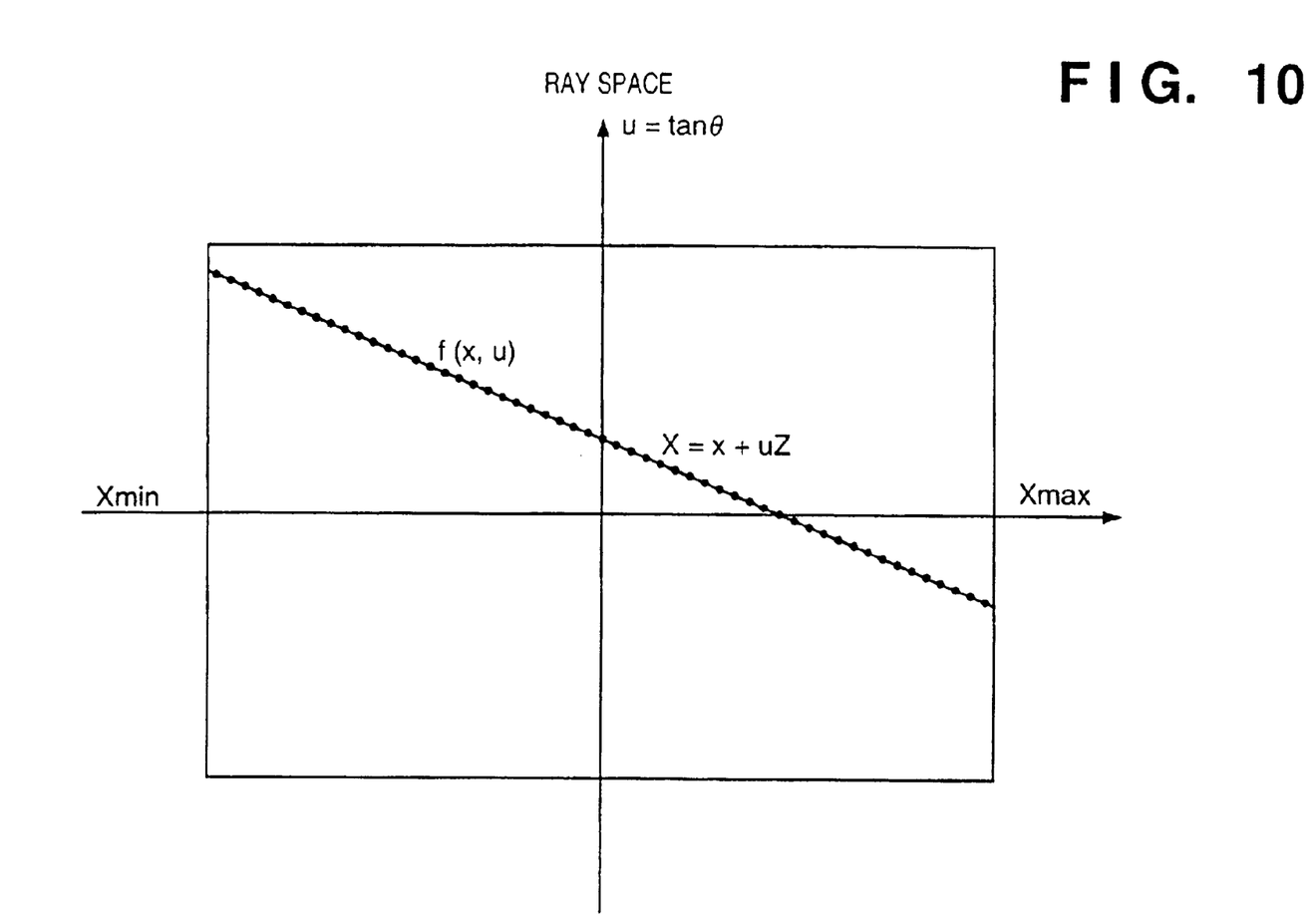
FIG. 10 is a view for explaining sampling and storage of ray space data in the embodiment of the present invention.

In this manner, ray space data become points discretely sampled on a line, as shown in FIG. 10.

Smoothness of movement when the user or object moves at high speed in the virtual space depends on the rendering frame rate. That is, as the rendering frame rate goes higher, the user or object can experience smoother movement in the virtual space. But if the frame rate is low, the user or object may experience unnatural sensation since the low frame rate results in jerky motion. Hence, in order to implement smooth movement in virtual space when the moving speed of the user or object is high, the rendering rate must be higher improved. However, this means an increase in the total number of pixels of an image to be reconstructed from ray space data and, hence, rendering may not be done in time. To solve this problem, in this embodiment the sampling rate in FIG. 10 is changed. That is, if sampling of every two pixels is fast enough to catch up with rendering, every two pixels are sampled. User's moving speed is detected by the movement of a mouse in this embodiment. If this speed is assumed to be v cm/s, the degree of load on rendering at that time is k.v (k is a predetermined constant). The sampling rate, n, must assume a highest possible value. The sampling rate n (pixel interval) is a function of the load k.v. The sampling rate n assumes a numerical value that may retard rendering if it is set to be lower than that value, and can be determined in advance in accordance with the rendering speed of this system and the value of the load k.v. When said n is determined, ray space data are sampled at n-sample intervals in FIG. 10. The data size to be processed is decreased by sampling at n-pixel intervals to cope with movement of the user or object or scrolling. Even when the resolution lowers by decreasing the data size, while the user or object is moving in the space, the visual characteristics of the user who is observing that movement, i.e., identification performance for details of a moving object or scene impairs, so a space with lower resolution does not pose any problem.

Figure 9:
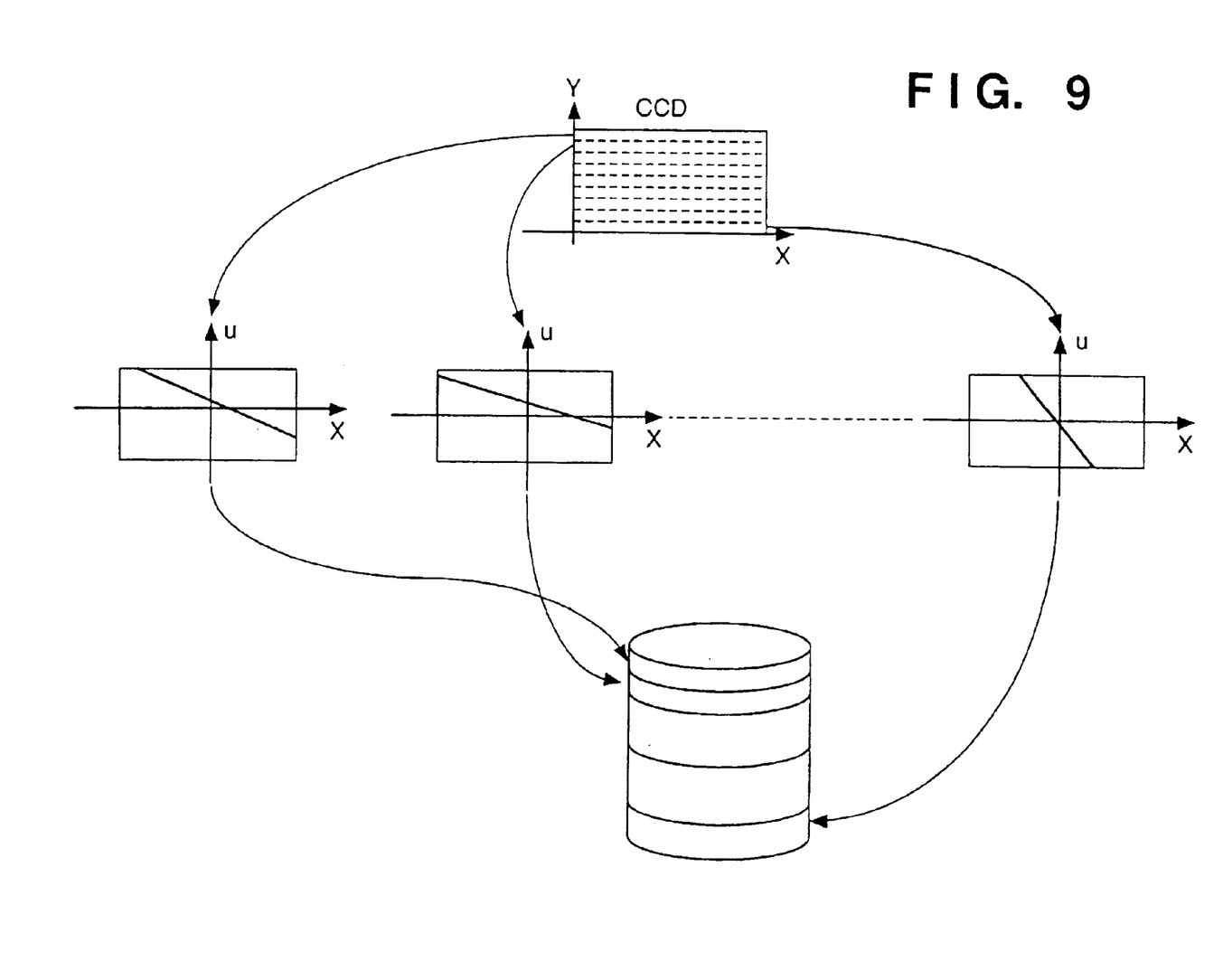
FIG. 9 is a view for explaining storage of ray space data in the embodiment of the present invention.
Figure 11:
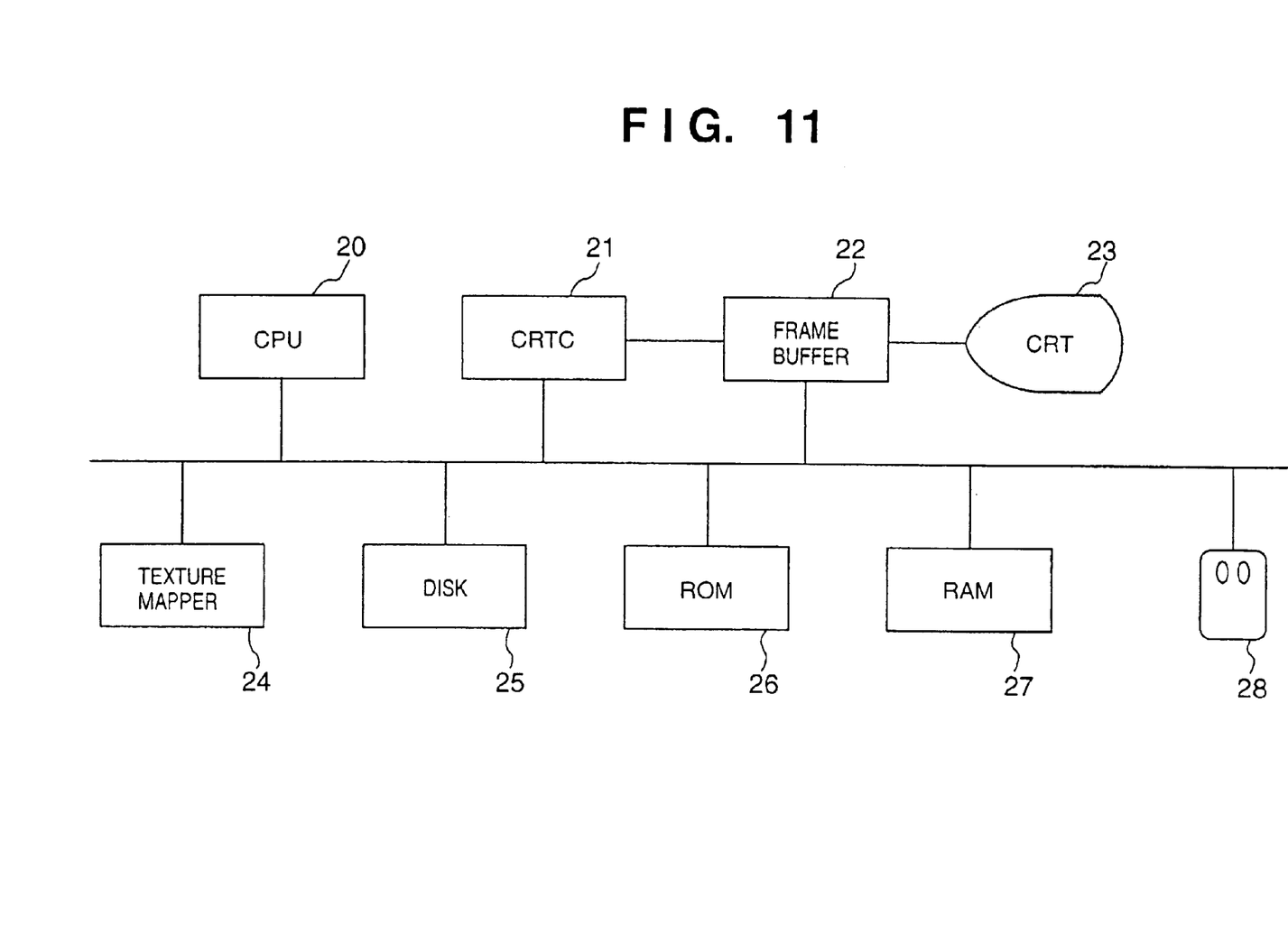
FIG. 11 is a block diagram showing the hardware arrangement of the embodiment of the present invention.
Figure 12:
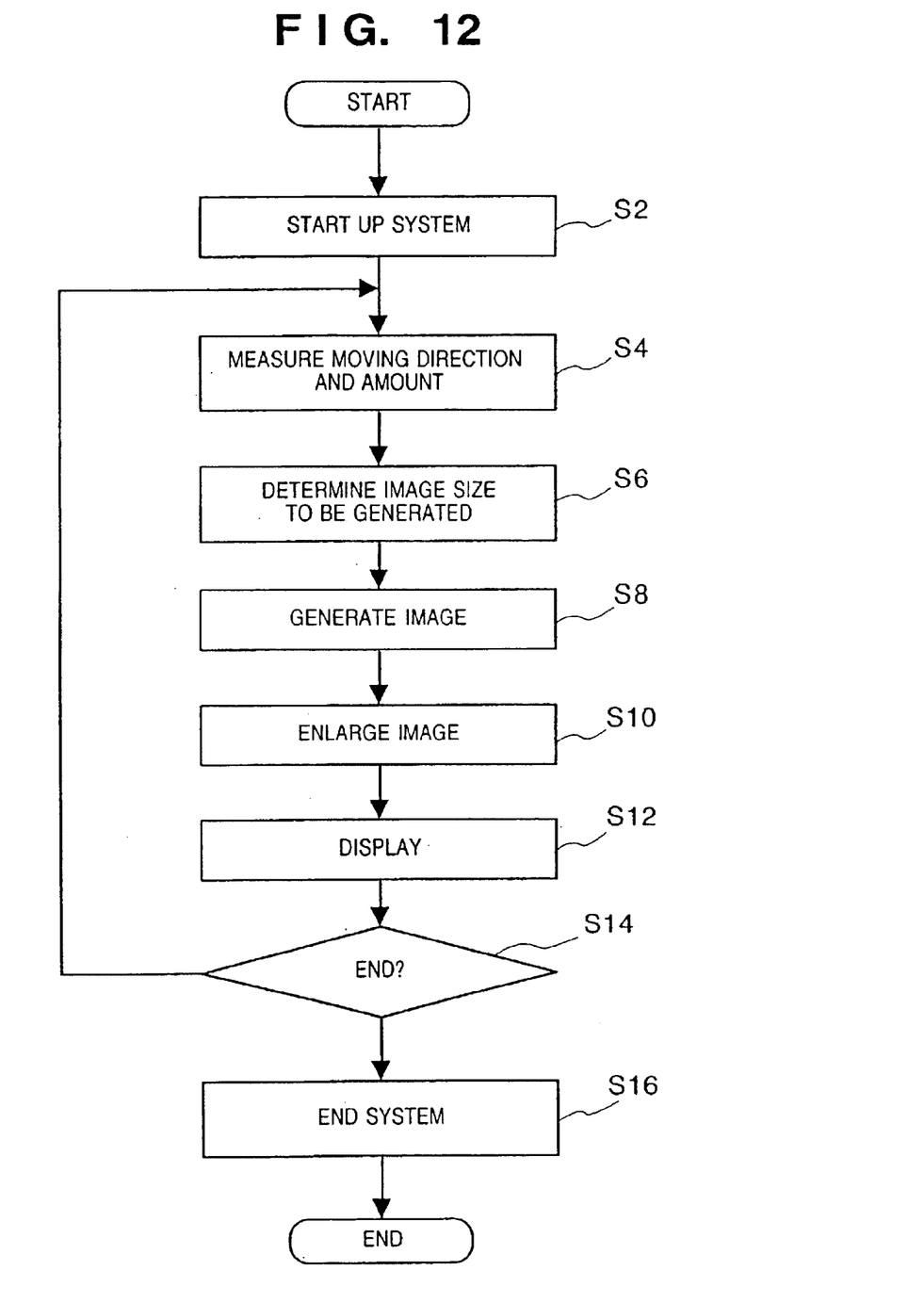
FIG. 12 is a flow chart showing the control sequence in the embodiment of the present invention.

FIG. 11 shows the system arrangement of this embodiment. The hardware arrangement shown in FIG. 11 is that of a normal workstation. Referring to FIG. 11, especially, a disk 25 stores a large volume of ray space data, as shown in FIG. 9. This system presents a virtual space to the user on a CRT 23. At this time, the user can freely walk through that virtual space or can manipulate (move, rotate, or the like) an object in the virtual space by operating a mouse 28. The walk through speed or manipulating speed of the object is the moving speed of the mouse 28. FIG. 12 shows the control sequence of the system shown in FIG. 11.

When the system is started up in step S2, the moving direction and moving amount v of the mouse are computed on the basis of user operation for the mouse 28 in step S4. In step S6, the image size is determined from the size of the display range of the CRT 23. In step S8, the sampling rate n (pixels) is determined from the moving amount v of the mouse, and ray space data are read out at this sampling rate n (pixels) from the disk 25 to reconstruct an image.

In step S10, the image is enlarged. Since image reconstruction done in step S8 is decimation at the sampling rate n, the image is reduced. Hence, the image is enlarged to the image size determined in step S6. This enlargement is implemented using a texture mapper 24, a known hardware tool. In this manner, image interpolation is done, and image display at the required resolution is implemented.

Various modifications of the present invention may be made.

Modification 1:

In the above embodiment, an image is reconstructed from a ray space data image database located at the same site. Also, the present invention can be applied to a case wherein the database is located at a remote location and connected via a network. This is because when the system of the present invention is used via the network, variations of the transfer rate depending on the load on the network pose the same problem as that posed when the walk through speed of the viewer (user) exceeds the rendering rate. That is, even when change or motion of an image is small, a jerky image may be presented as the frame rate drops via the network. This is because the CPU of the receiving image processing apparatus cannot receive data fast enough even if it has more than adequate capacity. When the present invention is applied to solve such problem, by setting the sampling rate of image data between the transmitting and receiving apparatuses in accordance with the data transport rate of the network, a smoothly moving image can be provided although image quality deteriorates to some extent.

Figure 13:
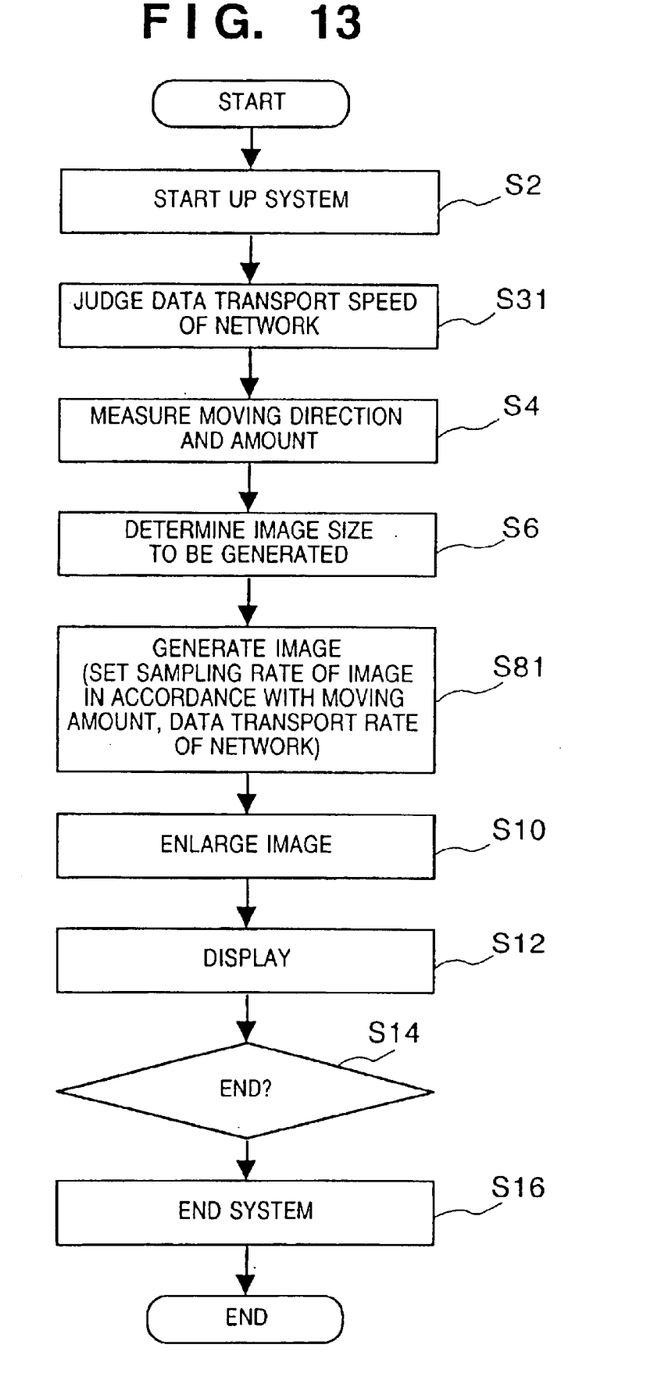
FIG. 13 is a flow chart showing the process in the modification 1 of the present invention.

FIG. 13 shows process of modification 1. When a process shown in the FIG. 13 is the same process shown in the FIG. 12, the process shown in the FIG. 13 is marked the number as the process shown in the FIG. 12. The explanator is omitted. The differences between process shown in the FIG. 13 and the process shown in the FIG. 12 are judgement the data transport rate of the network in step S31, and setting sampling rate of the image by referring data transport rate in a process of a image creating in step S81.

Modification 2:

The moving speed can be detected by means other than the mouse. That is, the walk through or scrolling speed need only be detected.

In the above embodiment, the load is assumed to linearly increase with respect to the moving speed of the user. However, the present invention is not limited to such assumption. For example, the resolution (the total number of pixels of an image) may be set in inverse proportion to the square of the speed. Furthermore, the resolution may be determined by actually measuring the speed.

Modification 3:

In the above embodiment, ray space data are obtained by computations, but may be pre-stored as a table in a RAM or ROM.

Modification 4:

The display device is not limited to the CRT. The present invention can also be applied to a lenticular or HMD display device.

To restate, according to the present invention, even when the virtual space defined by image data such as ray space data imposes a heavy processing load on a computer, an increase in load can be suppressed by lowering the resolution by decreasing the sampling rate. Especially, when the processing load increases upon movement in the virtual space by user operation or movement of an object in the virtual space, a decrease in resolution by decreasing the sampling rate does not pose any problem to user's vision. Since human's visual characteristics that perceptual sensitivity to object moving is low, deterioration of image quality can be ingored.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for generating an image of a virtual space according to a user's operation using ray space data comprising:

a recording unit adapted to record the ray space data;

an inputting unit adapted to input a user's operation of movement in the virtual space;

a setting unit adapted to set a sampling rate for the ray space data read out from said recording unit according to the user's operation, the sampling rate indicating a distance between pixels to be sampled;

a reconstructing unit adapted to read out ray space data from said recording unit according to the sampling rate set by said setting unit, and to reconstruct an image of the virtual space, the read out ray space data being arranged on a line in the ray space, and being on the line at an interval in accordance with the sampling rate; and an interpolation unit adapted to interpolate pixels of the image reconstructed by said reconstructing unit until the size of the image becomes a predetermined size, wherein the ray space data is managed in a (x,u) space, wherein "x" represents a position where the light ray intersects the X-axis and "u" represents a tangent of an angle the light ray makes with the Z-axis, and the ray space data read out by said reconstructing unit is data discretely sampled on a line in a ray space according to the sampling rate set by said setting unit.

2. The apparatus according to claim 1, wherein the setting unit determines the sampling rate on the basis of the moving speed in a virtual space designated by the user.

3. The apparatus according to claim 1, wherein the setting unit determines the sampling rate on the basis of the manipulation speed of an object in a virtual space designated by the user.

4. An image processing method for reconstructing an image of a virtual space according to a user's operation using ray space data recorded in a recording means, comprising:

an inputting step of inputting a user's operation of movement in the virtual space;

a setting step of setting a sampling rate for the ray space data read out from the recording means according to the user's operation, the sampling rate indicating a distance between pixels to be sampled;

a reconstruction step of reading out ray space data from the recording means in accordance with the sampling rate set in said setting step, and reconstructing an image of the virtual; space, the read out ray space data being arranged on a line in the ray space, and being on the line at an interval in accordance with the sampling rate; and an interpolation step of interpolating pixels of the image reconstructed by said reconstruction step until the size of the image becomes a predetermined size, wherein the ray space data is managed in a (x,u) space, wherein "x" represents a position where the light ray intersects the X-axis and "u" represents a tangent of an angle the light ray makes with the Z-axis, and the ray space data read out by said reconstruction step is data discretely sampled on a line in a ray space according to the sampling rate set by said setting step.

5. A computer-readable storage medium for storing a program which makes a computer function as an image processing apparatus for generating an image virtual space according to a user's operation using ray space data recorded in a memory, the program comprising:

an inputting step of inputting a user's operation of movement in the virtual space;

a setting step of setting a sampling rate for ray the space data read out from the memory according to the user's operation, the sampling rate indicating a distance between pixels to be sampled;

a reconstructing step of reading out ray space data from the memory according to the sampling rate set in said setting step, and reconstructing an image of the virtual space, the read out ray space data being arranged on a line in the ray space, and being on the line at an interval in accordance with the sampling rate; and an interpolation step of interpolating pixels of the image reconstructed in said reconstructing step until the size of the image becomes a predetermined size, wherein the ray space data is managed in a (x,u) space, wherein "x" represents a position where the light ray intersects the X-axis and "u" represents a tangent of an angle the light ray makes with the Z-axis, and the ray space data read out by said reconstruction step is data discretely sampled on a line in a ray space according to the sampling rate set by said setting step.

6. An image processing apparatus for generating an image of a virtual space according to a user's operation using ray space data comprising:

a recording unit adapted to record the ray space data;

a setting unit adapted to set a sampling rate for ray space data read out from said recording unit according to the user's operation, the sampling rate indicating a distance between pixels to be sampled;

a reconstructing unit adapted to read out ray space data from said recording unit according to the sampling rate set by said setting unit, and to reconstruct an image of the virtual space; and an interpolation unit adapted to interpolate pixels of the image reconstructed by said reconstructing unit until the size of the image becomes a predetermined size, wherein ray space data is managed in a (x,u) space, wherein "x" represents a position where the light ray intersects the X-axis and "u" represents a tangent of an angle the light ray makes with the Z-axis, and wherein a quantization of the position x is done using the minimum spacing between two neighboring light rays on the x-axis, a quantization of u is done using the tangent of an angle between two neighboring pixels and a camera view point position.

7. The method according to claim 4, wherein the setting step determines the sampling rate on the basis of the moving speed in a virtual space designated by the user.

8. The method according to claim 4, wherein the setting step determines the sampling rate on the basis of the manipulation speed of an object in a virtual space designated by the user.

9. An image processing method for reconstructing an image of a virtual space according to a user's operation using ray space data recorded in a recording means, comprising:

a setting step of setting a sampling rate for ray space data read out from the recording means according to the user's operation, the sampling rate indicating a distance between pixels to be sampled;

a reconstruction step of reading out ray space data from the recording means in accordance with the sampling rate set in said setting step, and reconstructing an image of the virtual space; and an interpolation step of interpolating pixels of the image reconstructed by said reconstruction step until the size of the image becomes a predetermined size, wherein ray space data is managed in a (x,u) space, wherein "x" represents a position where the light ray intersects the X-axis and "u" represents a tangent of an angle the light ray makes with the Z-axis, and wherein a quantization of the position x is done using the minimum spacing between two neighboring light rays on the x-axis, a quantization of u is done using the tangent of an angle between two neighboring pixels and the camera view point position.

* * * * *